May 28, 1974 G. PLURA 3,813,333
METHOD OF TREATING FLUID IN A CONTINUOUS MANNER
Filed April 19, 1972
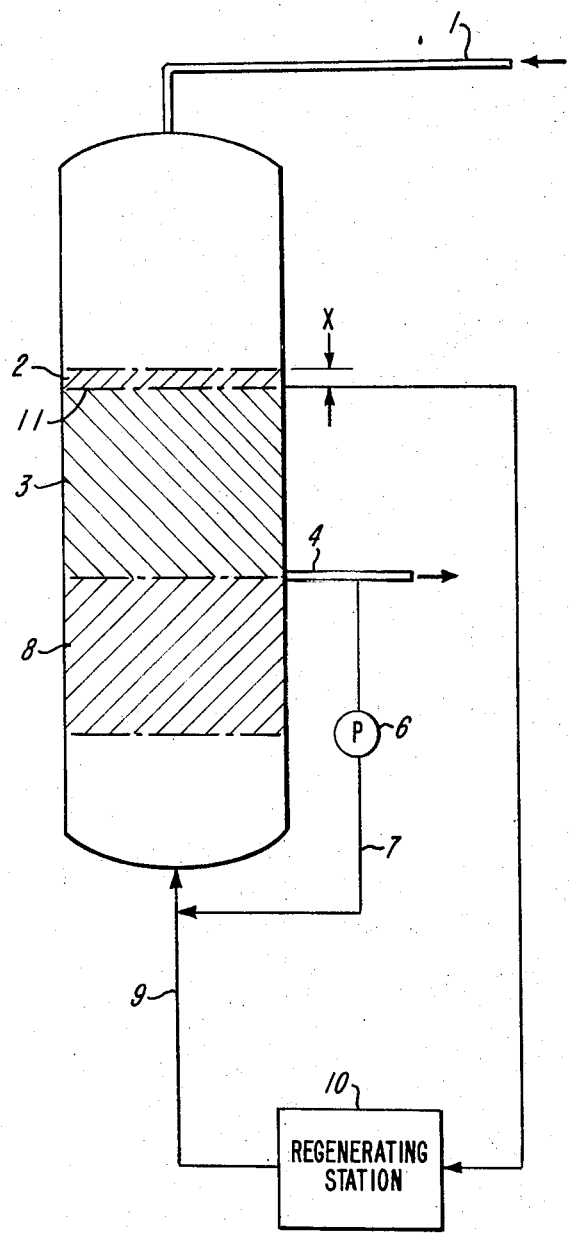

United States Patent Office 3,813,333
Patented May 28, 1974

3,813,333
METHOD OF TREATING FLUID IN A CONTINUOUS MANNER
Georg Plura, Bergneustadt, Germany, assignor to L. & C. Steinmuller G.m.b.H., Postfach, Gummersbach, Germany
Filed Apr. 19, 1972, Ser. No. 245,481
Claims priority, application Germany, Apr. 20, 1971, P 21 18 949.1
Int. Cl. B01d 15/02
U.S. Cl. 210—33                          2 Claims

ABSTRACT OF THE DISCLOSURE

A method of continuously treating fluids, according to which the fluid to be treated, after entering the ion exchange bed, is subdivided into at least two branch streams, at least one of which serves to carry off used up ion exchange particles, while the other is treated in the ion exchange bed and, after reaching the maximum approximation of the desired properties, enters into a bed section comprised exclusively of regenerated ion exchange particles. From here the branch stream is withdrawn, and the discharged finished fluid stream is subsequently divided into at least two branch streams, at least one of which conveys the regenerated ion exchange particles to the bed, and the bed in its entirety, in view of the pressure differential in the non-treating bed section and in the treating bed section, is moved against the direction of flow of the fluid to be treated.

---

The present invention relates to a method of treating fluids in a continuous manner. According to this method, the fluids to be treated are passed through an ion exchange bed having nearly constant volume. During the loading phase, the ion exchange particles do not change their location within the bed. Nearly constant volumetric portions of used up exchange particles as well as regenerated exchange particles are continuously carried off from and supplied to the bed respectively.

In order to obtain the continuity of the method, the heretofore known methods for continuous treatment of fluids, especially water, are bound or limited on the one hand by a definite bed form and on the other hand by a definite bed construction. According to one heretofore known method for continuous treatment of fluids, especially for the softening and/or desalting of water, a whirl bed is used to which natural or untreated water is added from beneath through poured filling material. The used up ion exchange particles are carried off through the poured filling material through discharge pipes, and are conveyed into a regenerating column through a plurality of interposed auxiliary devices. Corresponding to the withdrawal of used up ion exchange particles, regenerated ion exchange particles are simultaneously supplied to the whirl bed. As a result of the use of a whirl bed, a large expense for apparatus is necessary. Such expense is reflected not only in a very slender loading or take up column, but also in a large regenerating column. Aside from these drawbacks, the maximum approximation of the desired purity to a sufficient extent is attainable with the bed form which is used in this method only if very slender and very tall loading or take up columns are used.

A further method for continuous treatment of water or other aqueous fluids is known, with which a specific construction of the bed assures the continuity of the method. The construction of the bed is of such a type, that finely divided magnetic material is added to the ion exchange particles. The bed is defined on the top and bottom sides by perforated plates, which are provided with screens. The fluid to be treated is introduced into the bed from below above a perforated plate which defines the bottom of the bed, and is withdrawn from above a perforated plate which defines the top of the bed. The used up exchange particles pass through the lower perforated plate into a funnel-shaped outlet, and from there, with the aid of a resin delivery pump, into a regenerating station. From this regenerating station the regenerated ion exchange particles, again with the help of a resin delivery pump are supplied to the bed anew through a conduit ending below the perforated plate defining the upper side of the bed. The drawbacks inherent to this known method consist primarily in that the resin delivery pumps, which guarantee the continuity of the method, require an addition of magnetized particles to the ion exchange particles. Without such an addition, the ion exchange particles splinter or shatter during the course of the method, and a steadily increasing pressure loss results; consequently, interruptions in operation are unavoidable.

It is an object of the present invention to produce a method for continuous treatment of fluids, according to which, the ion exchange bed is continuously moved counter to the direction of flow of the fluid which is to be treated.

This object and other objects and advantages of the invention will appear more clearly from the following specification in connection with the accompanying drawing, which shows a form of construction according to the invention, which may be applied not only to a single bed but also to a mixed bed.

The invention is characterized primarily in that the fluid to be treated, after entry into the ion exchange bed, is subdivided into at least two branch streams. At least one branch stream serves to carry off used up ion exchange particles, while the other branch stream is treated in the ion exchange bed and, after reaching the maximum approximation of the desired properties, enters into a bed section comprised exclusively of regenerated ion exchange particles. From here the branch stream is withdrawn, and the discharged finished fluid stream is subsequently subdivided into at least two branch streams. With the help of at least one branch stream, the regenerated ion exchange particles are conveyed to the bed, and the bed in its entirety, in view of the pressure differential in the non-treating bed section and in the treating bed section, is moved against the direction of flow of the fluid to be treated.

The above described method according to the invention may also, without straying from the principles of the invention, be practiced in such a way that the fluid to be treated, after entry into the ion exchange bed, is subdivided into at least two branch streams. At least one branch stream serves to carry off used up ion exchange particles, while the other branch stream is treated in the ion exchange bed and, after reaching the maximum approximation of the desired properties, enters into a bed section comprised exclusively of regenerated ion exchange particles. From here the branch stream is withdrawn, and the discharged finished fluid stream is subsequently subdivided into at least two branch streams. With the help of at least one branch stream, the regenerated ion exchange particles are conveyed to the bed, and the bed in its entirety, in view of the pressure differential in the non-treating bed section and in the treating bed section, is moved against the direction of flow of the fluid to be treated. In this connection the passage of the still to be treated fluid or the paassge of the finished fluid is selectively continuously subjected to brief changes either in the main stream or in the branch streams, as will be described in detail later.

Referring now to the drawing in detail, the fluid to be treated flows first through section 2 as main stream 1, and then as a partial stream through section 3, of the treating bed section, emerging at the lower end thereof at 4. A partial stream 5, withdrawn at a distance X from the entrance level of the section 2, conveys the used up ion exchange particles which are to be regenerated into a regenerating station 10. A partial stream of the finished treated fluid which emerges at 4, is conveyed by means of a delivery pump 6 and a conduit 7 into the lower portion of the bed and upwardly against the main stream 1 through the bed section 8 in a closed circuit, which again emerges at 4. The regenerated ion exchange particles are carried out of the regenerating station 10 through conduits 9 in an upward stream into the bed section 8 of the main bed. As a result of a sufficiently high pressure differential between the bed section 8 and the bed sections 2 and 3, the bed in its entirety moves upwardly against the direction of flow of the main stream of the fluid to be treated. This pressure differential may be of any convenient magnitude and may by any standard means be controlled at will. It may also depend on the prevailing conditions. When the bed section 3 exceeds the fixed line of height 11, the highly charged ion exchange particles are continuously withdrawn from the fluid to be treated by means of a partial stream 5 and transmitted to the regenerating station 10. Nearly the same volumes, which are withdrawn in the form of used up ion exchange particles by means of the partial stream 5, are added to the bed section 8 from below out of the regenerating station 10 through the conduit 9 together with a partial stream of the finished fluid.

The movement of the ion exchange bed in its entirety against the main direction of flow of the fluid to be treated may also be aided by continuously subjecting the main stream of the fluid to be treated or the main stream of the finished fluid, as well as the partial streams of the fluid to be treated and the finished fluid to brief changes. As to an example for these brief changes, it may be assumed that the pressure of the main stream 1 drops whereas the pressure of stream 9 is maintained. In such an instance, the entire bed would move upwardly in a direction counter to the direction of movement of the main stream 1. Under such circumstances it automatically becomes important when a change in the pressure of the main stream 1 occurs, to change the pressures of the other liquid streams accordingly. If, however, in the above mentioned example the drop in pressure of main stream 1 is only very brief, such very brief pressure drop will not have any material influence on the working method or function of the bed. The bed in its entirety may briefly move upwardly or downwardly without the necessity of interrupting the treatment of the liquid stream 1. From the above it will thus also be clear that for purposes of moving the bed in one direction, a liquid stream may be subjected to brief changes. It will also be evident that the bed 2, 3 and 8 is a so-called compact free floating bed. This bed freely floats due to the pressure differential in beds 3 and 8, which pressure differential is caused by the liquid stream 1 and the stream 9 containing the regenerating substance. The thickness of the bed section is selected in conformity with the liquid to be treated and the prevailing pressure differential.

The basic substance of the bed consists of ion exchange material which, as mentioned above, can be obtained commercially from chemical companies. The individual bed sections shown in the drawing refer to already charged ion exchange particles, i.e. ion exchange particles which have taken part in the reaction, and to ion exchange particles which have not yet taken part in the reaction.

The bed section 8 comprises ion exchange material which has not yet taken part in the reaction. Bed 3 comprises ion exchange particles which have taken part in the reaction. The bed section 2 of the height "X" has associated therewith a withdrawing device (not shown) in order to withdraw from bed section 2 the used up ion exchange particles and to convey the same through conduit 5 to the regenerating station 10. Summarizing the above, it may be said that the bed sections 2, 3 and 8 consist of the same type of ion exchange particles which as to their composition are identical to each other but have already and to a different degree taken part in the treatment involved. The quantity of fluid withdrawn in the form of a partial stream at 5 and at 4 may be adjusted manually in conformity with the prevailing conditions.

The advantage obtained with the method according to the invention consists primarily in that a fluid, for example, water may be continuously treated. In this connection, especially in contrast to the heretofore known methods, no whirl bed is necessary. Rather, the method operates in a so-called compact free-floating bed, for which no fixed boundaries or limits are necessary at the top or bottom; instead, by means of the pressure differentials in the individual bed sections, the bed is continuously moved. The method according to the invention does not require a large expense for apparatus and extra auxiliary devices.

The method according to the invention as described in the specification, provides for supplying the fluid to be treated from above and the regenerated ion exchange particles from below. It is also possible to reverse the method, that is, to supply the fluid to be treated from below and the regenerated ion exchange particles from above.

It is, of course, to be understood that the present invention is, by no means, limited to the specific showing in the drawing, but also comprises any modifications within the scope of the appended claims.

What I claim is:

1. A method of treating a fluid supplied in a continuous manner according to which the liquid to be treated is passed through an ion exchange bed of nearly constant volume, which includes the steps of: building up an ion exchange bed having at least a first bed section and a second bed section and a third bed section, introducing the fluid to be treated into said first bed section, at the end of said first bed section continuously withdrawing therefrom exhausted ion exchange particles, regenerating said withdrawn exhausted ion exchange particles and introducing the thus regenerated ion exchange particles into said third bed section in a direction counter to the direction of movement of the fluid through said bed, passing the fluid to be treated from said first bed section into and through said second bed section for finish treatment of the fluid to be treated, at the end of said second bed section withdrawing from the latter the finish treated fluid and conveying a portion thereof under pressure to said third bed section for carrying said regenerated ion exchange particles into said third bed section and continuously moving the bed freely suspended in its entirety in a direction counter to the direction of movement of the fluid to be treated through said first and second bed sections.

2. A method of treating a fluid supplied in a continuous manner, which includes the steps of: building up an ion exchange bed having at least a first bed section, and a second bed section, and a third bed section, introducing the fluid to be treated into said first bed section, at the end of said first bed section splitting up the fluid in said first section into a first group of branch streams having at least a first and a second branch stream, by means of said first branch stream continuously withdrawing exhausted ion exchange particles from said first bed section, regenerating the said withdrawn exhausted ion exchange particles and introducing the regenerated ion exchange particles into said third section in a direction counter to the direction of movement of the fluid to be treated from said first bed section into said second bed section, conveying said second branch stream into said second bed section for further and finish treatment of said second branch stream, at the end of said second bed section withdrawing the finish treated fluid, from the thus withdrawn finish fluid withdrawing some finish treated fluid and after placing the same under pressure employing said withdrawn finish treated fluid for conveying said regenerated ion exchange particles into said third bed section and moving the bed freely suspended in its entirety in a direction counter to the direction of movement of the fluid to be treated through said first and second bed section.

References Cited

UNITED STATES PATENTS

| 3,512,640 | 5/1970 | Hellman | 210—189 |
| 3,512,639 | 5/1970 | Kugelman et al. | 210—189 |
| 3,512,642 | 5/1970 | Bevans | 210—189 |
| 3,674,685 | 7/1972 | Arden et al. | 210—189 |

SAMIH N. ZAHARNA, Primary Examiner

B. CASTEL, Assistant Examiner

U.S. Cl. X.R.

210—34, 35